United States Patent

Gervais

[15] 3,654,753

[45] Apr. 11, 1972

[54] TOBACCO HARVESTING MACHINE

[72] Inventor: Adrien C. Gervais, Barrie Hill Farms R.R. No. 2, Barrie, Ontario, Canada

[22] Filed: Nov. 30, 1970

[21] Appl. No.: 93,559

[52] U.S. Cl. .................................................. 56/27.5
[51] Int. Cl. ............................................... A01d 45/16
[58] Field of Search .................... 56/27.5, 30, 126, 12.8, 12.9

[56] References Cited

UNITED STATES PATENTS

| 2,509,970 | 5/1950 | Edmonds | 56/30 |
| 2,813,390 | 11/1957 | Irvine | 56/27.5 |
| 3,093,949 | 6/1963 | Splinter | 56/27.5 |
| 3,417,556 | 12/1968 | Jones et al. | 56/27.5 |
| 3,550,365 | 12/1970 | Lovett et al. | 56/27.5 |

FOREIGN PATENTS OR APPLICATIONS

| 204,773 | 4/1968 | U.S.S.R. | 56/27.5 |

*Primary Examiner*—Russell R. Kinsey
*Attorney*—Fetherstonhaugh & Co.

[57] ABSTRACT

A tobacco harvesting machine for cutting tobacco leaves from the stalk of the tobacco plant. The machine has a self-propelled frame which is formed with the passage through which the plants pass as the frame moves along a row of plants. The machine provides an upward draft of air about the plant as it enters the passage in the frame so that the tobacco leaves are all lifted upwardly by the air draft to be disposed parallel to the stalk of the plant. The leaves are clamped against the stalk when in this upwardly directed position by means of conveyers which are mounted on the frame and located on opposite sides of the passageway. An assembly of cutter blades are mounted in the frame so as to provide at least three upstanding cutting edges which are operable in response to movement of the tobacco plant through the passage to provide cutting actions disposed in planes which are spaced about 120° relative to one another so that as the frame moves relative to the stalk of a plant, any stems which are located within the path of any of the cutter blades will be cut. The cutter blades are mounted so as to pivot relative to their mounting in the event that the cutting edges strike a member, such as a sucker, which cannot be cut by the blades during the forward movement of the frame. The harvesting machine is also provided with conveyers for conveying the cut leaves to the storage receptacle in a manner such that all of the stems of the leaves are disposed generally parallel with one another and the cut ends are all located at the same end of the stack of leaves.

18 Claims, 9 Drawing Figures

PATENTED APR 11 1972

INVENTOR
ADRIEN C. GERVAIS

BY Featherstonhaugh & Co.

ATTORNEYS

INVENTOR.
ADRIEN C. GERVAIS
BY Featherstonhaugh & Co
ATTORNEYS

PATENTED APR 11 1972

*INVENTOR.*
ADRIEN C. GERVAIS

BY *Featherstonhaugh & Co.*

ATTORNEYS

TOBACCO HARVESTING MACHINE

FIELD OF INVENTION

This invention relates to tobacco harvesters. In particular, this invention relates to a tobacco harvester for mechanically cutting the leaves from a tobacco plant.

PRIOR ART

The harvesting of tobacco has always been a costly and time-consuming operation. Tobacco leaves must be handled very carefully to prevent bruising or damaging the leaves in harvesting. Damaged or bruised leaves do not produce high quality tobacco when cured and no harvesting machinery has yet been developed which is capable of removing the tobacco leaf efficiently and without causing damage to a substantial proportion of the crop which is harvested. For these reasons, substantially all of the tobacco which is harvested throughout the world is harvested manually, with the result that the labour costs involved in harvesting the product are very substantial. In addition, this type of manual labour is extremely unpleasant and an adequate labour force to perform this type of operation is not readily available.

Attempts have been made to provide machinery for the harvesting of tobacco. However, the machines which have been developed tend to damage the tobacco leaf and they do not cut the leaf stem sufficiently close to the stalk to effect an efficient harvesting of the crop. Preferably, the crop which is harvested should consist of the leaf portion and the stem which supports the leaf. The leaf and its stem are both used in the production of tobacco. The only portion of the plant which is not suitable for this purpose is the stalk and any suckers which are on the plant. The mechanical devices which have been developed tend to remove the leaf portion while the stem portion of many of the leaves remains attached to the stalk. This problem arises due to the manner in which the stems grow out of the stalk. The stems are spaced one above the other and each adjacent stem is circumferentially spaced with respect to one another. The effect is that the stems are located on a spiral path extending upwardly from the lower end of the stalk. In the known devices, the cutters are not adapted to cut the stems which are not directly in line with the direction of movement of the harvesting machine. Due to the characteristic growth of the stems previously described, the result is that the known machines can only efficiently harvest about 25 percent of the leaves. Of the remaining 75 percent, various lengths of the stems will be left on the plant. The stems are of substantial weight and in view of the fact that tobacco is sold by weight, there is a considerable loss to the farmer if the stems are left on the stalk.

SUMMARY

The present invention overcomes the difficulties of the prior art described above by providing a machine wherein the stem of each leaf, regardless of its position on the stalk, can be cut very close to the stalk of the plant and wherein the leaves are held relative to the stalk while the cutting action takes place and discharged from the holding device after the cutting has been completed.

According to an embodiment of the present invention a tobacco harvesting machine for cutting tobacco leaves from a stalk consists of a frame, means for generating an upward draft of air, clamping means for clamping the tobacco leaves against the stalk, cutter blade means for cutting the leaves from the stalk and conveyor means for conveying the cut leaves to a storage receptacle. The frame has a longitudinal passage through which the tobacco plants pass as the frame is moved along a row of plants and the draft generating means operates to force the leaves upwardly when the plant is located in the passage. The cutter blade means is mounted in the frame and consists of at least three upstanding cutting edges spaced at about 120° relative to one another in response to movement of a tobacco plant through said passage to cut through any stems which are disposed in the cutting planes.

PREFERRED EMBODIMENT

The invention will be more clearly understood after reference to the following detailed specification read in conjunction with the drawings, wherein FIG. 1 is a pictorial view of a self-propelled harvesting machine according to an embodiment of this invention;

Figure 1:
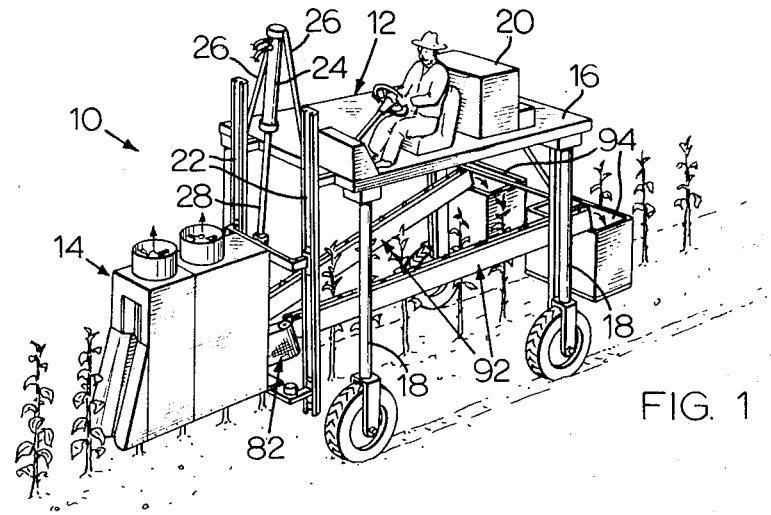

With reference to the drawings, reference numeral 10 refers generally to a self-propelled harvesting machine according to an embodiment of the present invention. The machine includes a self-propelled carrier unit 12 and a harvesting device 14.

The self-propelled carrier unit 12 consists of an elevated platform 16 mounted on four wheel units 18 and driven by a power plant 20 in a known manner. The carrier 12 has a pair of parallel slides 22 mounted at the forward end thereof. A hydraulic cylinder unit 24 is supported at the upper end of the slides 22 by means of a pair of support bars 26. The hydraulic unit 24 has a piston rod 28 extending downwardly therefrom to be connected to the harvesting cutter unit 14 as will be described. The elevated platform type of carrier unit is particularly convenient for use in a tobacco harvesting machine so as to permit the machine to straddle a row of tobacco plants and to enable the operator to align the harvesting device with a row of tobacco plants.

Figure 2:
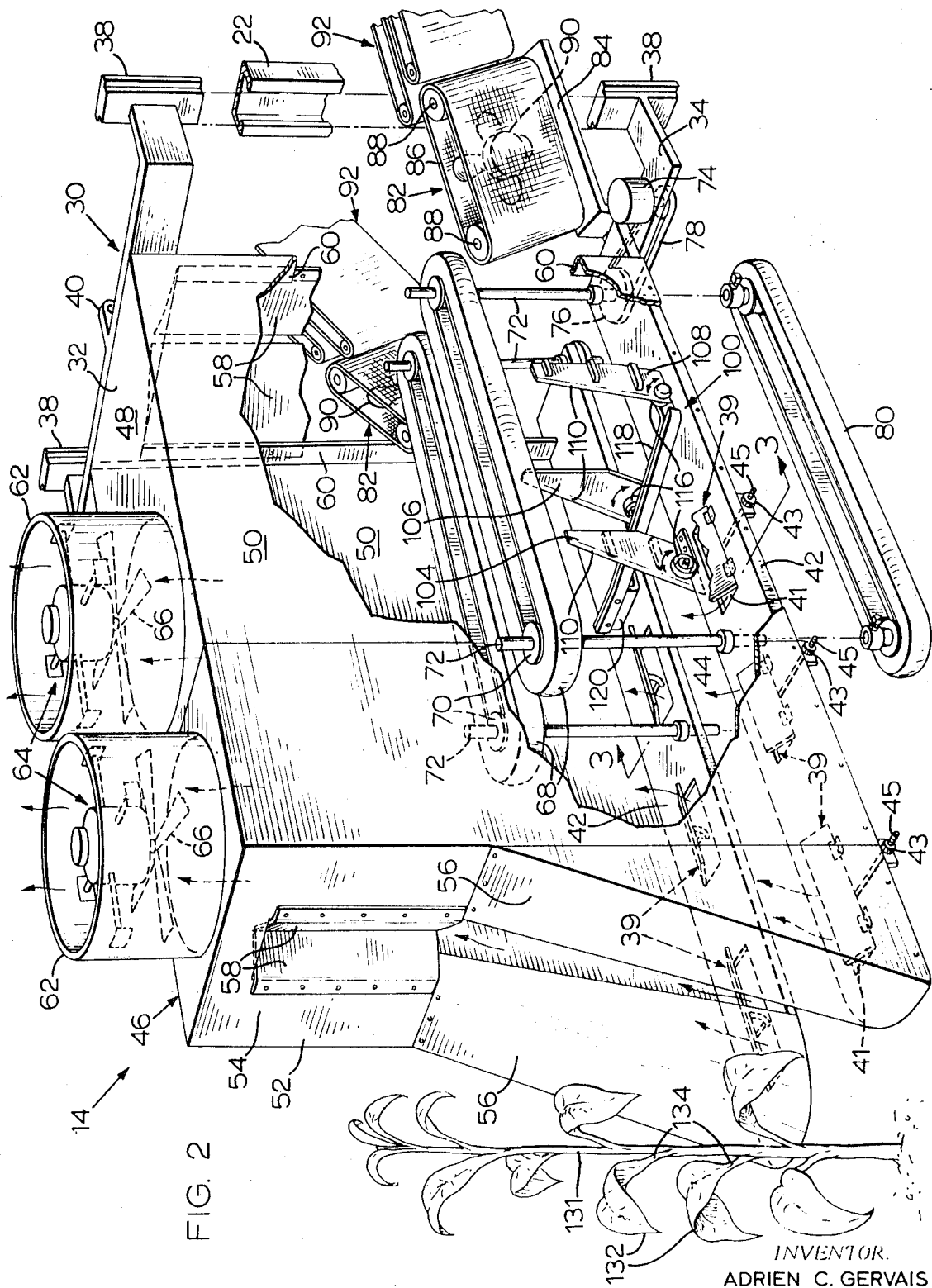
FIG. 2 is an enlarged detailed view with portions broken away of the harvesting portion of the machine of FIG. 1.

Referring to FIG. 2 of the drawings, it will be seen that the harvesting cutter device according to the present invention consists of a frame which is generally identified by the reference numeral 30. The frame includes an upper U-shaped crossbar member 32 and a pair of lower L-shaped members 34 (only one of which is shown). The upper U-shaped member 32 and the lower L-shaped members 34 are connected by a pair of side members 38, the central portion of which is broken away in FIG. 2 for the purposes of illustration. The side members 38 fit in the slide members 22. A lug 40 projects rearwardly from the upper U-shaped bar 32 and is connected to the connecting rod 28 of the hydraulic cylinder 24 so that the entire cutting assembly 14 may be raised and lowered on the slides 22 by means of the hydraulic cylinder 24.

Due to the fact that tobacco leaves ripen from the bottom of the plant upwardly so that the lower leaves are ripe before the upper leaves are ripe, tobacco plants are harvested by removing the lower leaves first and at a later date removing the leaves at the next lower level, and so on until all of the leaves have been removed. By providing means for adjusting the level of the harvesting cutter device of this invention, it is possible to ensure that all of the leaves may be removed from the tobacco plant by successive passes of the harvesting machine as the leaves ripen.

The frame 30 also includes a pair of base plates 42 which are arranged in spaced parallel relationship with respect to one another to define a longitudinal passage 44 therebetween. The base plates 42 are provided with a number of small trap doors 39 which are hingedly mounted to open and close the passages 41 so as to regulate the air flow through the passages 41 in use. Adjustment of the trap doors can be achieved by the thumb screws 43 carried by control rods 45. A casing generally identified by the reference numeral 46 includes a top wall panel 48 and a pair of oppositely disposed side wall panels 50 which are secured at their lower edges to the outer edges of the base plates 42. The casing has a front wall 52 which consists of an upper U-shaped portion 54 and a pair of lower leg portions 56 which are spaced apart a distance substantially equal to the width of the passage 44 so as to define the entry to the casing. The overall width of the casing is such that it will pass over one row of plants during harvesting without damaging the plants in the adjacent rows. A pair of flexible closure members 58 project inwardly adjacent the upper end of the casing 46 so as to substantially close the upper end of the entrance passage. The members 58 are sufficiently flexible to be readily deflected to allow a tobacco plant to pass therethrough. The members 58 serve to assist in the creation of the upward draft which will be described hereinafter. At the rear end of the casing, narrow end walls 60 project inwardly and again a pair of flexible door members 58 are secured at the upper end thereof to assist in closing the upper end of the enclosure. It will be understood that if the upwardly directed draft generated by the fan described below is sufficient it may be possible to eliminate the flexible closure member 58.

An important feature of the present invention is the provision of an upwardly directed air draft around the tobacco plant so that the tobacco leaves are positioned in an upwardly directed location about the stalk of the plant prior to cutting. By arranging the stems parallel with one another before they are cut it is possible to maintain all of the stems in this parallel relationship throughout the harvesting process and thereby assist in the subsequent operation where the tobacco is tied to the lathe for curing purposes. The casing 46 provides the necessary enclosure within which the required upward draft can be created and the draft itself is created by means of a pair of draft ducts 62 which open through the top wall 48 of the casing. A fan and motor assembly generally identified by the reference numeral 64 is mounted in each of the ducts 62 and the fan blades 66 are rotatably driven by their respective motors so as to create an upwardly directed air draft within the casing.

When the leaves of a tobacco plant have been drawn upwardly into a position wherein they are located closely adjacent to the stalk of the tobacco plant, it is then necessary to clamp the leaves in this position so that they may be firmly held during the cutting operation. In the apparatus illustrated, the clamping is achieved by a pair of conveyor belts 68 which are mounted on pulleys 70 which are located on support shafts 72. The height of the pulleys 70 and their conveyer belt 68 is adjustable on the shaft 72 so that the height of the conveyer above the base plate may be adjusted according to the height of the blades and the size of the leaves to be harvested. The support shafts 72 at the forward end of the conveyers are spaced rearwardly from the forward end of the casing a sufficient distance to ensure that the effect of the upwardly directed air draft will be sufficient to locate the leaves in the upwardly directed position before they are clamped by the conveyers 68. Preferably the conveyers 68 are adjustable as to height on the shafts 72 so as to accommodate the differences in lengths of the tobacco leaves which occur from the bottom leaves to the top leaves of any one plant.

Figure 8:
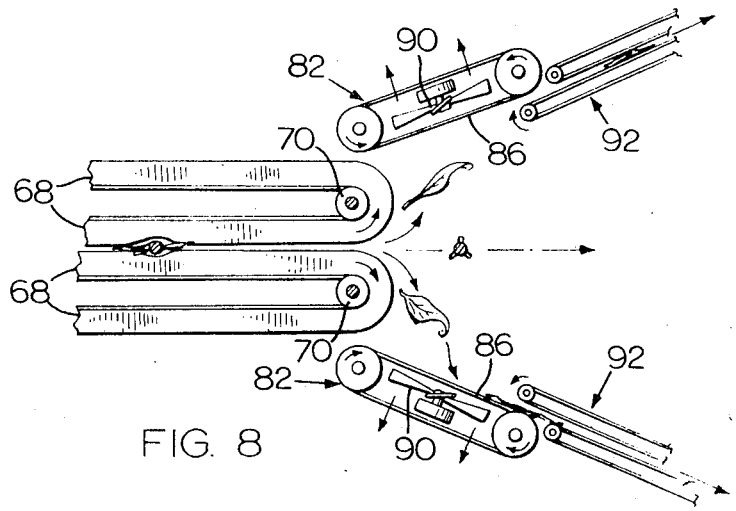
FIG. 8 is a plan view illustrating the manner in which the cut leaves are discharged from the harvesting device and transmitted to a storage device.
Figure 4:
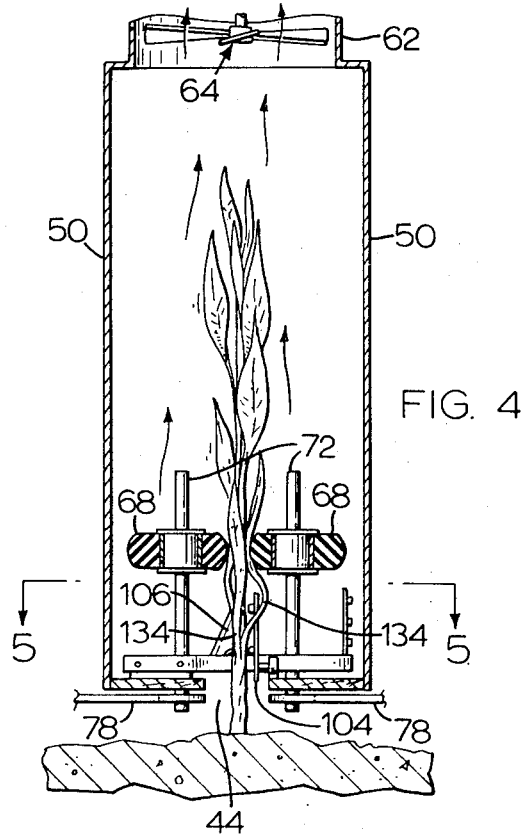
FIG. 4 is a view similar to FIG. 3 showing a tobacco plant located within the harvester in use.

Preferably the conveyers 68 are made from a relatively thick resilient sponge-like material so as to be readily deformable when in engagement with a tobacco plant so as to wrap around the plant in use and retain the leaves in the clamping position illustrated in FIGS. 4 and 8 of the drawings. In addition, the conveyers 68 are preferably driven at a speed equal to the forward movement of the harvesting device. In FIG. 2 of the drawing, a motor 74 is shown connected to a pulley 76 on the lower end of the shaft 72 by means of a belt 78. This arrangement of drive is also used in order to drive the other of the shafts 72. It will be understood, however, that the motor 74 may be replaced by a mechanical drive system operated by a ground engaging wheel so as to ensure that the movement of the conveyors closely approximates the forward movement of the harvesting machine so that the conveyer belts themselves do not move relative to the leaves which they are gripping in use.

A further pair of conveyers 80 (only one shown) are mounted on the lower ends of the shafts 72 in parallel relationship with respect to the conveyers 68. These lower conveyers 80 serve to engage the lower end of the stalk of a tobacco plant while the upper conveyers 68 engage an upper end of the same stalk. The lower end of the stalk being more rigid than the upper end, the conveyers 80 serve to prevent the stalk from being bent by the conveyers 68 in use. The lower conveyers 80 act as stabilizers for the tobacco stalk when cutting leaves which are located towards the upper end of the stalk. Where the leaves which are being cut are located towards the lower end of the stalk, stabilizing conveyers 80 are not required and may be removed.

After the leaves have been cut from the stalk of the tobacco plant, they are discharged from the conveyers 68 at the rear end thereof and they are drawn against one or other of the conveyers 82 which are located on opposite sides of the discharge end of the conveyers 68. The conveyers 82 each consist of a base plate 84 which is adjustably mounted on the frame members 34 so as to adjust the height of the conveyer 82 as required in use so that the conveyers 82 may be maintained in a close proximity to the conveyers 68 when they are adjusted in height. Each of the conveyers 82 consists of a porous conveyer belt 86 which extends over a pair of roller members 88 which are rotatably mounted on the base plate 84. A fan and motor assembly 90 is located within the space formed within the conveyer and it is operable to create a draft to suck the leaves discharging from the conveyers 68 onto the inner conveying surface of the conveyer belt 86. The leaves which are gripped by the conveyer belting 86 then pass to a pair of secondary conveyer assemblies 92. The assemblies 92 consist of a pair of conveyer belts disposed in a close face to face relationship so that the leaves discharged from the conveyer belting 86 are gripped between the conveyers 92 so as to be transmitted away from the cutter assembly to a pair of storage containers 94 (FIG. 1) mounted at the rear end of the self-propelled carrier. This assembly for discharging the leaves from the conveyer is capable of transferring the leaves from one conveyer to another without bruising the leaves. It will be understood, however, that various modifications to this assembly may be effected without departing from the scope of this invention.

Figure 9:
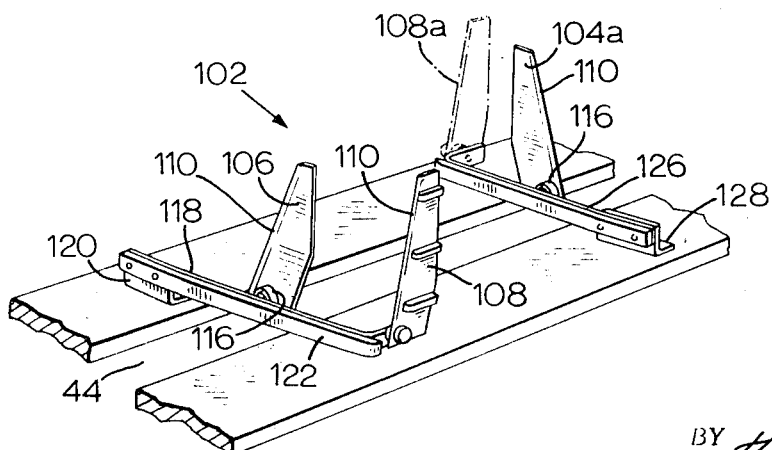
FIG. 9 is a pictorial view of an alternative arrangement of cutter blades.

The most important features of the present invention is the arrangement of the cutter blades which permit the machine to cut through the stems of the tobacco leaves closely adjacent to the stalk of the tobacco plant. One blade assembly 100 is illustrated in FIGS. 2, 5, 6 and 7 and a second blade assembly 102 is illustrated in FIG. 9.

Figure 5:
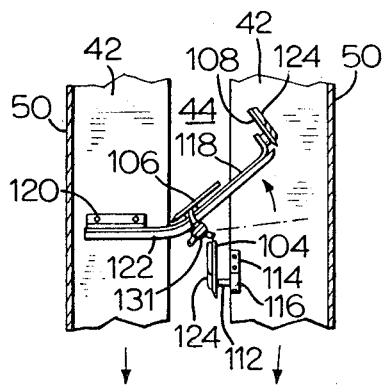
FIG. 5 is a plan view of the cutter blade assembly taken in the direction of the arrow 5—5 of FIG. 4 and illustrating the cutting action.
Figure 6:
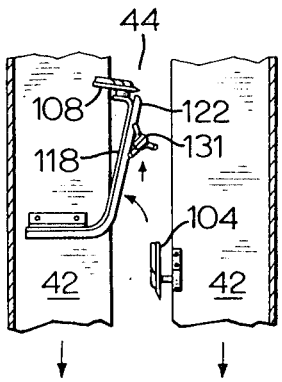
FIG. 6 is a view similar to FIG. 5 illustrating a further step in the cutting action.
Figure 7:
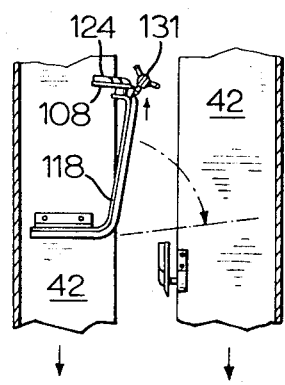
FIG. 7 is a plan view similar to FIG. 6 illustrating a further step in the cutting action.

In the cutter blade assembly 100, three cutter blades 104, 106 and 108 are illustrated. Each blade has a cutting edge 110 and a lower edge 111 which are both upwardly and rearwardly inclined with respect to the vertical so that when the blade is in use, it will cut by a slicing operation and cutting will take place from the under side of the stem towards the upper side and it will be free to pivot rearwardly as described below. As shown in FIGS. 5, 6 and 7, the blade 104 is mounted on the shaft 112 which is pivotally mounted on plate 114 which is secured to the base plate 42. The blade 104 is mounted to extend substantially parallel to the passageway 44 which extends between the base plates 42 and it is mounted adjacent to the edge of the base plate to which it is secured. As shown in FIG. 2 of the drawings, the shaft 112 is mounted on one end of a coil spring 116 and the other end of the coil spring 116 is secured to the plate 114. The plate 114 is mounted on the spring 116 so that if, during the cutting operation, the blade strikes a member which it cannot cut such as a sucker, it will pivot rearwardly about the axis of the coil spring so that the cutting edge may slide under the material which it is incapable of cutting without causing the blade to be broken from its mounting. The inclined lower edge 111 provides a clearance which permits the blades to pivot rearwardly even when they are in a position overlying the base plate 42. The suckers which grow on a tobacco plant are located at the intersection of the upper surface of the stem and the stalk. These suckers can be extremely tough and if the blades were not pivotably mounted the suckers could damage the cutter blades.

The cutter blades 106 and 108 are both mounted on the flexible metal strap 118 which is secured by means of an angle bracket 120 to the opposite base plate to which the plate 114 is secured. Again, the blades 106 and 108 are spring mounted by means of coil springs 116 so that the blades 106 and 108 may pivot rearwardly as described with reference to the blade 104 to prevent damage to these blades in use. A spacer strap 122 of a tough, resilient, flexible material is secured to the forward face of the flexible strap 120 and spacer ribs 124 are secured to the rubbing faces of the blades 104 and 108. The strap 122 and ribs 124 serve to keep the cutting edges spaced a short distance from the stalk of the tobacco plant in use.

As shown in FIG. 2 of the drawings, the blade 106 is disposed in a plane which extends at right angles to the longitudinal axis of the passageway 44 and it is preferably located with the cutting edge 110 thereof disposed on the opposite side of the centre line of the passageway 44 to that on which the support bracket 120 is mounted.

The third blade 108 is mounted so that when the strap 118 is in its relaxed position, it is disposed substantially parallel to the axis of the passageway 44. The blade 108 is located at the end of the strap 118.

As previously indicated, an alternative form of blade mounting is illustrated at 102 in FIG. 9. In this embodiment, the blades 106 and 108 remain the same as previously described with reference to FIG. 2 while the fixed blade 104 is replaced by a blade 104a. Blade 104a is pivotally mounted on a flexible support strap 126 which is substantially similar to the strap 118 previously described. The blade 104 is mounted by means of a coil spring 116 so as to be rearwardly pivotable in the same manner as the blades 106 and 108. The strap 116 is mounted by means of an angle bracket 128 on the opposite side of the passage 44 to the mounting 120 of the blades 106 and 108. Again, the strap 126 has a facing spacer member of tough, wear-resistant material 130 secured to the forward face thereof. When in the relaxed position, the blade 104a is mounted at right angles to the axis of the passageway 44 and it is preferably located with the cutting edge 110 disposed on the opposite side of the centre line of the passage 44 from its mounting bracket 128.

Preferably the blades 104, 104a, 106 and 108 are mounted so as to be readily removable so that blades of different heights can be substituted depending upon the proportions of the leaves and stems which are to be cut from the tobacco plant.

A typical tobacco plant is illustrated in FIG. 2 of the drawings and consists of a stalk 131 and a plurality of leaves 132 which are connected to the stalk by stems 134. The stems 134 extend outwardly from the stalk at vertically spaced locations and each successive stem is circumferentially spaced from its adjacent stem so that an imaginary line extending between the stems would have a generally spiral configuration. The stems are more closely grouped together towards the lower end of the stalk.

When the harvesting machine according to the present invention is to be used, the height of the cutter blades above the ground is determined according to which leaves are to be removed from the tobacco plant. The adjustment in height can be achieved as previously described by raising and lowering the frame by means of the hydraulic cylinder 24. In the embodiment illustrated in the drawings, the leaves which are being removed are the three lowermost leaves. As previously mentioned, tobacco plants ripen from the bottom so that the lower three leaves are the first to ripen and generally all three may be removed at the same time. Cutter blades 104, 106 and 108 of a height sufficient to provide the cutting edge to extend over the height between the lowermost stem and the uppermost stem are selected and mounted in the harvester as previously described. If it is desired to remove one or two leaves from the plant rather than three, the blades which are selected may be shorter in height than those required for removing the three leaves. Alternatively, the location of the blades relative to the plant can be adjusted by lowering the frame so that only the bottom one or two leaves will be removed.

Figure 3:
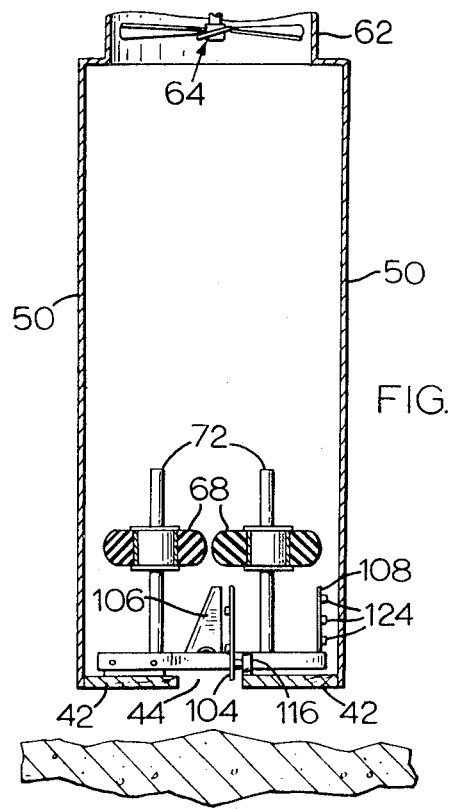
FIG. 3 is an end view of the harvester taken in the direction of line 3—3 in FIG. 2.

When the correct height and blades have been selected, the fan assemblies 64 are activated so as to create an upward draft within the casing. The small trap door assemblies 39 are adjusted to assist in creating the required upward flow of air. The gap between the conveyer belts 68 is adjusted to give the required clamping effect. The harvesting machine is then lined up with a row of tobacco plants as illustrated in FIG. 1 with the passageway 44 of the harvesting device in alignment with the row of plants. The harvester is then driven forward so that the first tobacco plant in the row enters the casing. It will be noted from FIG. 2 that there is a substantial space between the entry to the casing and the forward end of the clamping conveyer 68. While the plant is in this space, the upward draft of air created by the fan units 64 forces the leaves into an upwardly directed position as shown in FIG. 4 of the drawings. The leaves are maintained in this upwardly directed configuration while the harvester moves forward to a point where the stem and the lowermost leaves are located between the conveyer belts 68. When in this position, the upward draft is maintained by the second fan unit 64 so that the upper leaves will not fall down over the conveyer assembly and become damaged during the forward movement of the harvester. As the machine continues to move forward, the first blade 104 approaches the tobacco plant. If a stem 134 is located in the path of the cutting edge of the blade 104, as shown in FIG. 4 of the drawings, the forward movement of the blade 104 will cause the cutting edge 110 to engage and cut through the stem of the leaf and thereby release the leaf from the stalk. It will be understood that during the forward movement of the harvester, the conveyers 68 move at substantially the same speed as the forward movement of the harvester so that the stalk is held in the vertical position during the cutting operation. It will be noted that if a sucker was growing between the stem of the leaf and the stalk, the fact that the cutter blade of the present invention tends to cut from the lower surface of the stem towards the upper surface ensures the stem would be severed even although the blade was forced to pivot rearwardly about its spring mounting 116. The spacer ribs 124 which are formed on the inner face of the blade serve to space the cutting edge a short distance from the stalk so that the stalk is not damaged by the cutting edge during the cutting operation. If the stalk were damaged during the cutting operation, this could have a serious effect on the subsequent ripening of the other leaves and it could also create difficulties in attempting a further harvesting pass. After the stem has passed the first cutter blade, it comes into contact with the second cutter blade 106. As shown in FIG. 3 of the drawings, the second cutter blade 106 is normally disposed at right angles to the longitudinal axis of the passage 44 so that it lies directly in the path of travel of the stem through the casing. When the stem strikes the spacer strap 122, further movement of the harvester causes the flexible metal strap 118 to bend rearwardly in the direction of the arrow shown in FIG. 5 of the drawings. Again, any stem which lies in the path of travel of the blade 106 from a transverse location to the generally longitudinally extending position will be cut by the cutting edge. Again, the spacer 122 serves to prevent damage to the stem during the cutting operation.

As the harvester continues to move forward, the stem will move past the cutter blade 106 and it will then approach the cutter blade 108. When the stem is approaching cutter blade 108, the flexible strap support 118 will be bent over to the position shown in FIG. 6 of the drawings wherein the blade 108 is disposed substantially transversely with respect to the longitudinal axis of the passage 44. As soon as the cutter blade 108 passes the main body of the stalk, the spring forces in the metal strap 118 will urge the blade 108 to move in the direction of the arrow shown in broken lines in FIG. 7 so that the blade 108 will swing in an arc and any stems which are located within the arc of the blade will be cut by the blade 108. Again, the spacers 124 serve to protect the stalk.

From the foregoing, it will be seen that the arrangement of cutter blades is such that a cutting action is provided in three directions, all of which are circumferentially spaced with respect to the axis of the stalk of the plant so that, regardless of the position from which a stem grows outwardly from a stalk, one or other of the cutter blades will cut the stem during the harvesting operation.

The alternative arrangement of cutter blades illustrated in FIG. 9 of the drawings, differs from that just described in that the blade 104a replaces the blade 104. Blade 104a operates in a manner similar to the blade 106 except that in use it is disposed on the opposite side of the path of travel of the plants and the straps 126 and 130 extend beyond the rear edge of the blade a sufficient distance to ensure that the blade will not be released before the stalk is completely clear of the return swing path of the blade. In further modification a fourth blade 108a, shown in broken lines in FIG. 9, may be secured at the end of strap 126 to extend parallel to blade 108. This additional blade will operate in the same manner as blade 108 and it would further ensure that all of the tobacco stems are cut regardless of there location with respect to the stalk.

The conveyers 68 continue to hold all of the leaves in the upwardly direction position until the cutter blades have completed their cutting operation. The leaves and stalk then exit from the rear end of the conveyers and the leaves are released. The fan assemblies 90 which are located within the porous conveyer belting 86 set up a sufficient sidewardly directed draft to draw the loose leaves onto the conveyer belting 86. The leaves then pass from the conveyer belting 86 to its associated conveyer belting assembly 92. The conveyer assembly 92 passes the leaves from the front end of the tractor to the storage containers 94 which are located towards the rear end of the tractor.

It will be understood that in most cases the tobacco plants will be located sufficiently close to one another that two or more tobacco plants may be located within the casing at any one time during the forward movement of the carrier.

After a first harvesting operation has been completed to remove the lowermost set of leaves, the height of the cutter blades relative to the carrier may be adjusted so that as soon as the next set of leaves have ripened on the tobacco plants, the harvesting process can be repeated as previously described.

From the foregoing, it will be apparent that the present invention provides a simple and efficient method and apparatus for harvesting tobacco plants wherein the tobacco leaves can be removed mechanically without excessively damaging the leaves so that the quality of the leaves is not affected by the mechanical harvesting.

Various modifications of the apparatus of the present invention will be apparent to those skilled in the art without departing from the scope of the claims.

What I claim as my invention is:

1. A tobacco harvesting machine for cutting tobacco leaves and their supporting stems from the stalk of tobacco plants arranged in rows in a field, comprising
   a. frame means having a longitudinal passage extending therethrough to permit tobacco plants to pass therethrough as said frame is moved along a row of plants bearing leaves to be harvested, said passage having a longitudinally extending axis alignable with a row of plants,
   b. means for generating an upward draft of air to force the tobacco leaves into an upwardly directed configuration about the stalk of the plant,
   c. clamping means for clamping a number of leaves and their stems in said upwardly directed configuration during movement of a tobacco plant through said passage,
   d. cutter blade means mounted on said frame to provide three upstanding cutting edges spaced at about 120° intervals from one another in response to the movement of a tobacco plant through said passage so as to cut through any stems disposed in the planes of the cutting edges,
   e. means for conveying the cut leaves to a storage receptacle.

2. A tobacco harvesting machine as claimed in claim 1 wherein at least two of said cutting edges are mounted for movement from one side of said longitudinal axis of said passage to the other in response to movement of a tobacco plant through said passage.

3. A tobacco harvesting machine as claimed in claim 1 wherein said cutter blade means are mounted to permit said cutting edges to operate in sequence.

4. A tobacco harvesting machine as claimed in claim 1 wherein said cutter blade means comprises (a) first cutter blade means mounted on said frame on one side of said longitudinal axis of said passage and disposed adjacent said one side and having a cutting edge disposed parallel to said longitudinal axis, (b) second cutter blade means mounted on said frame on the other side of said passage and having a cutting edge disposed in a plane extending generally transversely of said passage, said second cutter blade means being pivotally mounted so as to pivot the cutting edge thereof from the transversely extending plane to a longitudinally extending plane disposed adjacent said other side of said passage in response to movement of a tobacco plant through said passage, (c) third cutter blade means pivotally mounted on said frame for movement in an arc across said passageway with said third cutting edge generally transversely disposed with respect to the longitudinal axis of said passageway, said third cutter blade means being mounted for movement immediately after the passage of the tobacco plant thereby.

5. A tobacco harvesting machine as claimed in claim 1 wherein said cutter blade means comprises a first cutter blade mounted on a first side of said passageway and having a cutting edge disposed adjacent to said one side and arranged in a plane parallel to said longitudinal axis of said passage. A resiliently flexible member having one end mounted on the second side of said passage and longitudinally spaced with respect to said first blade means, second cutter blade means mounted on said flexible member and having a cutting edge disposed parallel to the transverse extent of said flexible member, and third cutter blade means mounted at the free end of said flexible member to dispose the cutting edge thereof in a plane substantially at right angles to the transverse extending direction of said flexible member, said flexible member being adapted to bend on contact with a tobacco plant passing through said passageway so as remove said first cutting edge from said transversely extending position to a generally longitudinally extending position to cut any leaves or stems located in the path of movement thereof, said flexible member simultaneously moving said third blade member to a position disposed rearwardly of the second blade member and inclined generally transversely with respect to the longitudinal passageway, said flexible member being releasable immediately after the tobacco plant passes beyond the free end of the flexible support member such that said flexible support member drives said third blade member in an arc from said second transverse position to said first longitudinal position to cut any stems located in the path of movement of the third cutting edge.

6. A tobacco harvesting machine as claimed in claim 4 wherein said first cutter blade means is pivotally mounted on said one side of said passageway to be movable from a position wherein the cutting edge thereof is disposed in a generally transversely extending plane to a second position wherein the cutting edge is disposed generally longitudinally adjacent said first side of said passage to cut any stems located in the path of travel of said first cutting edge between the transverse end and longitudinal positions.

7. A tobacco harvesting machine for cutting tobacco leaves as claimed in claim 1 wherein the cutting edges of said blade means are upwardly and rearwardly inclined so that the stems of the tobacco plant are cut in a direction from their underside towards their upper side.

8. A tobacco harvesting machine as claimed in claim 1 including pivot means for pivotally mounting each of said cutter blades about a horizontal axis extending at right angles to the cutting edges thereof, said pivot means being disposed below the level at which cutting takes place so as to permit said cutter blade means to pivot rearwardly about said pivot means out of the path of an obstruction which offers more resistance to cutting than the normal stem of a tobacco plant, and spring means engaging said cutter blade means to prevent rearward pivoting of said cutter blade means in normal use when cutting tobacco stems.

9. A tobacco harvesting machine as claimed in claim 1 wherein said clamping means comprises a pair of resilient conveyer means disposed one on either side of said passageway and extending longitudinally thereof from a position in advance of said first cutter blade means to a position disposed rearwardly of the plane of the last cutting action, said conveyer means being movable in response to forward movement of said frame so as to prevent relative movement between said conveyer means and a tobacco plant clamped therein.

10. A tobacco harvesting machine as claimed in claim 1 wherein said cutter blade means include spacer means for spacing the cutting edges thereof a predetermined minimum distance from the stalk of the tobacco plant during the cutting action.

11. A tobacco harvesting device as claimed in claim 9 wherein said conveyer means comprises a pair of conveyer belts formed from a resilient belting material of substantial thickness.

12. A tobacco harvesting machine as claimed in claim 11 wherein said conveyer belts are adjustable in height with respect to said cutter blade means.

13. A tobacco harvesting machine as claimed in claim 1 wherein said frame means includes enclosure means for defining an enclosure spaced outwardly and upwardly from said passageway.

14. A tobacco harvesting machine as claimed in claim 13 wherein said means for generating an upward draft of air comprises a passageway formed in the upper end of said enclosure and rotatably driven fan means mounted in said passageway for drawing air upwardly through said enclosure.

15. A tobacco harvesting machine as claimed in claim 14 wherein said enclosure means includes a forwardly projecting hood portion having additional means for generating an upward draft of air mounted therein.

16. A tobacco harvesting machine as claimed in claim 1 wherein said frame means is adjustably mounted on a movable carrier for vertical movement thereon to adjust the height of the cutter blade to the required height for harvesting.

17. A tobacco harvesting machine as claimed in claim 16 wherein said carrier comprising a self-propelled motor driven unit.

18. A tobacco harvesting machine for cutting tobacco leaves and their supporting stems from the stalk of tobacco plants arranged in rows in a field, comprising,
   a. a self-propelled carrier adapted to straddle a row of tobacco plants in use,
   b. cutter frame means mounted on said carrier,
   c. jacking means for adjusting the height of said frame means with respect to said carrier,
   d. said frame means having a longitudinal passage extending therethrough to permit tobacco plants to pass therethrough as said carrier moves along a row of plants bearing leaves to be harvested, said passage having a longitudinally extending axis alignable with a row of plants,
   e. means for generating an upward draft of air to force the tobacco leaves into an upwardly directed configuration about the stalk of the plant,
   f. clamping means for clamping a number of leaves and their stems in said upwardly directed configuration during movement of a tobacco plant through said passage,
   g. cutter blade means mounted on said frame to provide three substantially vertical cutting edges spaced at about 120° intervals from one another in response to the movement of a tobacco plant through said passage so as to cut through any stems disposed in the planes of the cutting edges,
   h. means for conveying the cut leaves to a storage receptacle.

* * * * *